SIGNAL GENERATOR PRODUCING LONG TIME DURATION PULSES

Filed Jan. 3, 1967 3 Sheets-Sheet 1

INVENTOR
Frank L. Petree
BY
De Lio and Montgomery
ATTORNEYS

SIGNAL GENERATOR PRODUCING LONG TIME DURATION PULSES

INVENTOR
Frank L. Petree

BY De Lio and Montgomery
ATTORNEYS

SIGNAL GENERATOR PRODUCING LONG TIME DURATION PULSES

Filed Jan. 3, 1967 3 Sheets-Sheet 3

INVENTOR

Frank L. Petree

BY

DeLio and Montgomery

ATTORNEYS

United States Patent Office 3,509,378

Patented Apr. 28, 1970

3,509,378

SIGNAL GENERATOR PRODUCING LONG TIME DURATION PULSES

Frank Lawrence Petree, Idaho Falls, Idaho, assignor to Numerical Analysis Corporation, New Haven, Conn., a corporation of Connecticut Filed Jan. 3, 1967, Ser. No. 606,600

Int. Cl. H03k *5/00, 17/00, 17/26, 17/28*

U.S. Cl. 307—269 10 Claims

ABSTRACT OF THE DISCLOSURE

A signal generator for providing long duration electrical signals, useful as timing signals, the signal generator having a differential amplifier, means for unbalancing the differential amplifier, means responsive to the means for unbalancing for generating a control signal, and means responsive to the control signal for rebalancing the differential amplifier.

This invention relates to a signal generator and more particularly to a signal generator capable of providing accurately timed pulses. The invention uses what is ordinarily termed as RC resistance capacitance timing techniques.

Heretofore, it was generally believed that resistance capacitance timers could not be developed which would provide timing pulses of more than five minutes duration. Applicant has advanced the state of the art significantly herein, by providing a resistance capacitance type of timer which has the capability of providing pulses with a duration of one thousand minutes or more. Applicant has found that a pulse generator according to his invention can be used in several applications, where a crystal oscillator is used, at roughly one-half the cost of the crystal oscillator. Additionally, applicant has found that by the use of a number of these generators, complex control functions may be generated.

More particularly, areas of use for the signal generator of this invention could include nuclear timers, starting and stopping of equipment, continuous cycling of equipment, laboratory timing of experiments, production testing of components or subassemblies, and continuous care medical applications. Specifically, uses for the signal generator of this invention include automatic sigh control for artificial lungs, a control for an automatic sample changer in respetitive testing of components, a sample changer control for mass spectrometer alpha, beta, gamma or neutron applications, and cycle timing for numerically controlled machine tools.

Accordingly, it is an object of this invention to provide a new and improved signal generator apparatus.

Another object of this invention is to provide a new and improved signal generator apparatus utilizing resistance capacitance techniques to provide timing signals from a fraction of one second to over one thousand minutes.

A further object of this invention is to provide a new and improved signal generator which is capable of providing a single signal or a plurality of repetitive signals, by which a pulse occurring at the end of each timing interval may be varied in duration.

Still other objects and advantages of this invention will in part be obvious and will in part appear hereinafter.

The invention accordingly comprises the features of construction, combinations of elements and arrangements of parts which will be exemplified in the constructions hereinafter set forth and the scope of the invention will be indicated in the claims.

Figure 1:
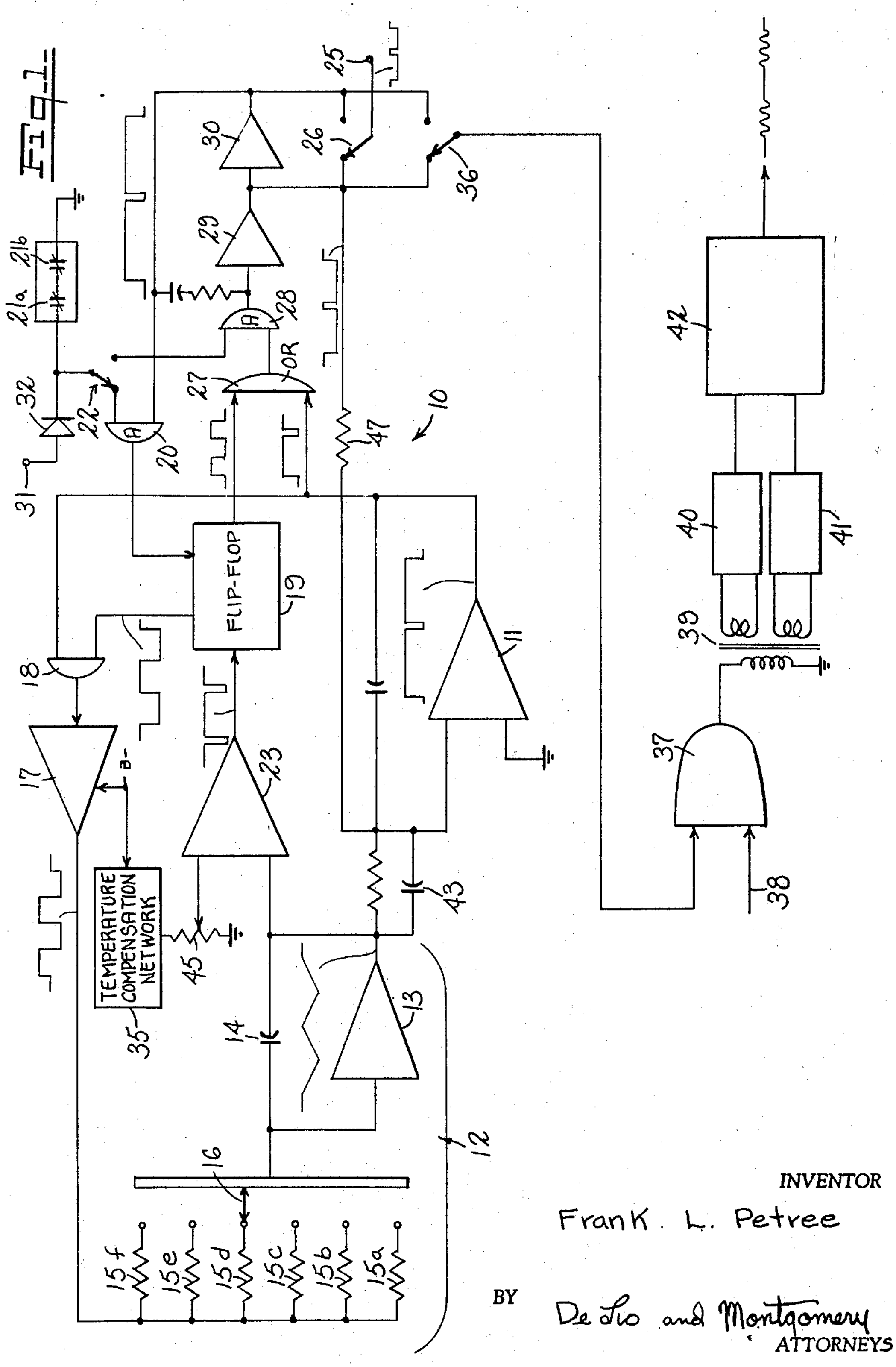
Figure 2:
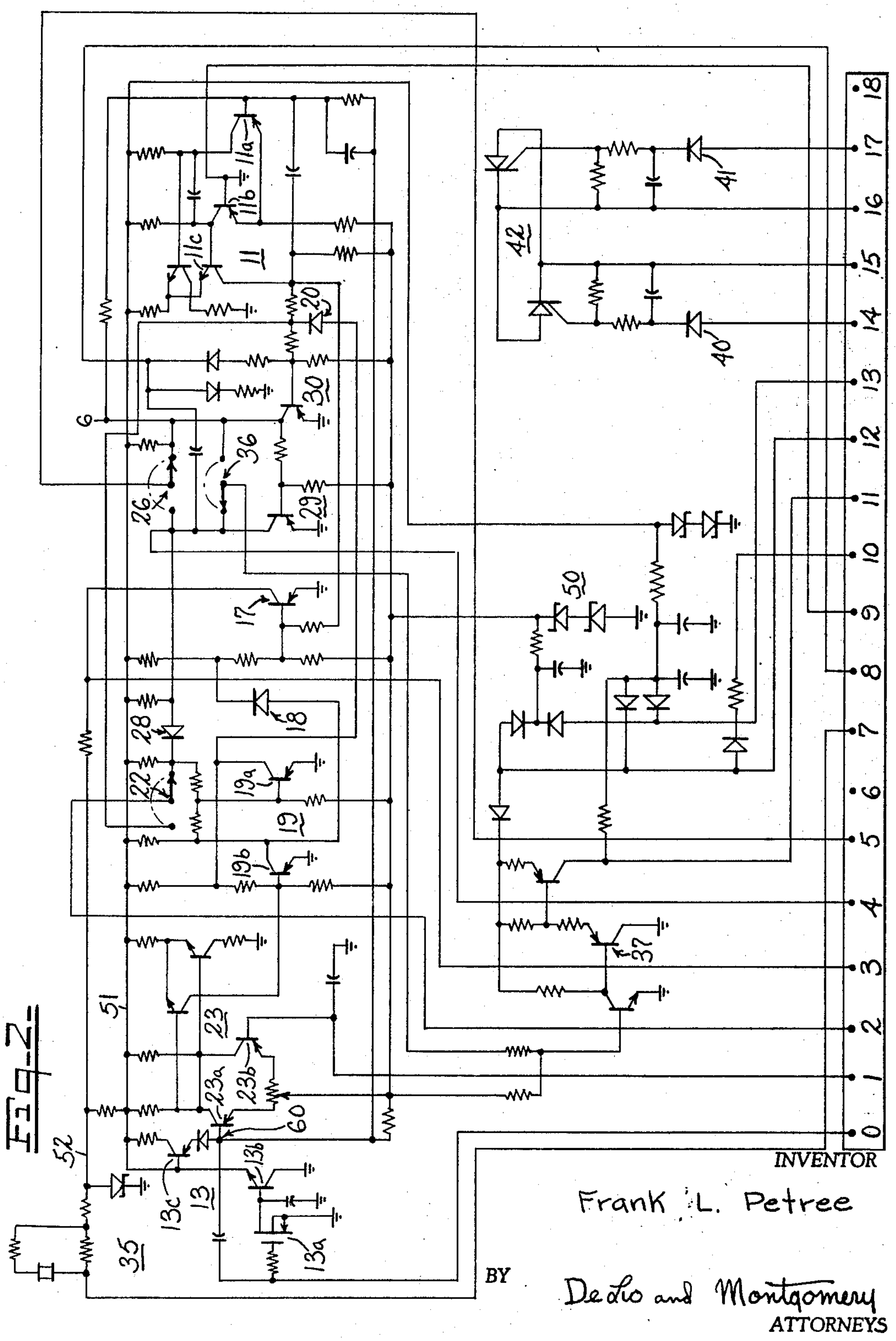
Figure 3:
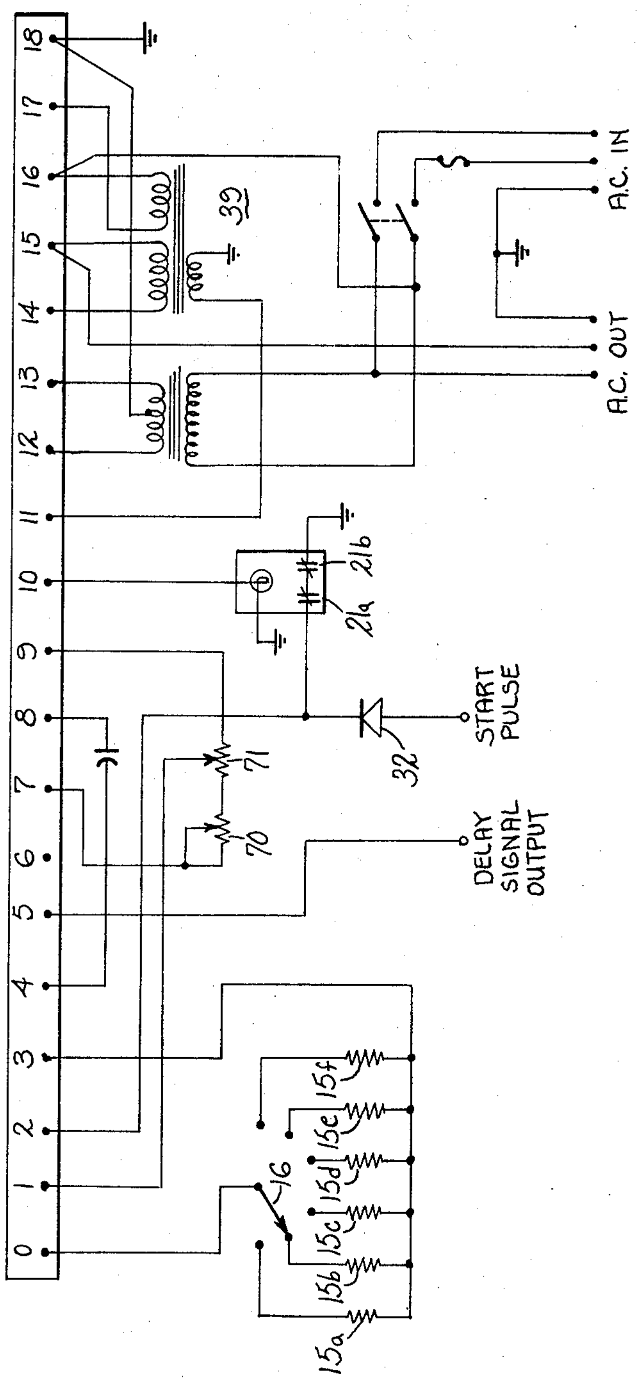

For a fuller understanding of the invention, reference should be had to the following detailed description taken in conjunction with the accompanying drawings, in which:

FIG. 1 is a block diagram of the signal generator according to this invention; and FIGS. 2 and 3 are the preferred schematic diagram of the signal generator shown in block form in FIG. 1.

Referring now to the block diagram of FIG. 1, the signal generator is generally shown at 10 and includes a differential amplifier 11 controlled by the resistance capacitance integrator shown at 12, which comprises an inverting amplifier 13, a capacitor 14 and a plurality of resistors 15*a*–15*f* of progressively greater resistance for controlling the rate of integration, and a switch shown diagrammatically at 16 for selecting one of said resistors.

Ths integrator 12 is controlled by an amplifier 17 which is itself controlled through a linear or proportional gate 18 by a flip-flop 19. The flip-flop provides a signal to gate 18 to either block or unblock a signal provided from the differential amplifier 11. In the unblocked condition, the signal provided from differential amplifier 11 passes through linear gate 18 and is amplified by amplifier 17. The flip-flop 19 is controlled by AND gate 20 which is in turn controlled by normally closed switches 21*a*, 21*b* and 22. By opening switch 21*a*, a plurality of repetitive signals may be provided and by opening switch 21*b*, a single pulse may be provided. The switch 21*a* is of the type which will remain open when it is depressed, whereas switch 21*b* is of the type which will close again after it is depressed. This type of switch, comprising switches 21*a* and 21*b*, may be obtained from Switchcraft Inc. The switches 21*a*, 21*b*, and gate 20 function to initially start the timing cycle and their description will be more fully set forth hereinafter.

The flip-flop 19 is controller by a pick-off device or, more particularly, a differential amplifying device shown at 23, which is responsive to the output signal provided by the integrator 12. The description and operation of the pick-off device 23 will be more completely described in conjunction with the operation of the block diagram of this figure.

The output from the device appears at 25 and is selected by a switch 26. The output is obtained through an "OR" gate 27, thence through an "AND" gate 28 which is selected by the switch 22, and then passes through two amplifiers 29 and 30 which function together as an adjustable one-shot multivibrator. The use of the switch 22 permits versatility in selecting the type of outputs desired from the signal generator, whereas the switch 26 permits either phase of the signal provided through "OR" circuit 27 to be obtained at the terminal 25. If it is desired that the signal genrator of this invention be controlled from an external signal, the external signal may be applied at the terminal post 31 though a diode shown at 32. In this case the switch 21*a* must be placed in position, such that repetitive signals or pulses will be provided. The external signal applied to the terminal 31 can be derived from computer logic or from a contact closure or from the output signals of another signal generator.

As an added feature of this invention, a temperature compensation network is provided at 35, which functions as a temperature-sensitive resistance network to the pick-off 23. If it is desired that the output of the signal generator be utilized to control an AC signal, an AC phase switch, shown at 36, is provided to control a chopper 37 which, in turn, controls a line voltage entering the chopper as shown by the arrow 38. Thereafter, the chopped line voltage is supplied through a transformer 39 an thence through phasing circuits shown at 40 and 41, respectively, to control the AC alternating current output of silicon controlled rectifiers 42.

In order to more fully point out the aspects of this invention, the operation of the signal generator of FIG. 1 will now be described.

In rest condition, the repetitive or single cycle switches 21*a* and 21*b* are closed, such that ground potential is applied to gate 20, assuming switch 22 is coupled thereto. In this condition the flip-flop 19 is set, as described below, to open gate 18 which allows the output of the differential amplifier 11 to be amplified by amplifier 17 and applied to the RC integrator shown at 12. The output of the RC integrator is applied by way of the noise filter network generally shown at 43 through the negative input of the differential amplifier 11. The positive input to differential amplifier 11 is at ground and so this feedback loop causes the output from the RC integrator 12 to remain at ground potential. A delay interval is normally started by setting the flip-flop 19, which would be accomplished automatically by the defferential amplifier 11, since its output is applied by way of two amplifiers 29 and 30, so as to set the flip-flop 19. However, the single cycle or repetitive switches 21*a* and 21*b* prevent this from occurring by blocking the signal at either the input gate 20 or the output gate 28 of the two amplifiers 29 and 30.

Assuming the repetitive switch 21a is now depressed and opened, flip-flop 19 will be set by the removal of the ground potential which opens "AND" gate 20. This causes gate 18 to be blocked and thus causes the amplifier 17 to go in a positive direction to ground potential. This unbalances the input to the integrator 12 so that its input commences to go negative at a rate determined by the resistance and capacitance of the integrator 12. The unbalancing of the differential amplifier 11 causes its output to go positive to saturation in an effort to balance the feedback loop. It is frustarted since the flip-flop 19 has blocked gate 18. The differential amplifier 11 will be unbalanced throughout the delay interval and therefore its output in fact defines the delay interval. With long delays, however, it does not start promptly when the switch 22 is depressed and so, to derive a clean, fast-rising output signal from the signal generator, the output from the flip-flop 19 is appled in an additive sense by means of the "OR" gate 27. The output of the flip-flop 19 arrives promptly as the switch 22 is depressed, of course, so that the out signal accordingly starts promptly.

The output of the integrator 12 continues to go negative at the same rate, owing to gate 18 being blocked by the flip-flop 19. Its output is applied through the positive input to the pick-off 23, the threshold of which is set by the fine time potentiometer shown at 45. As its output equals and just exceeds the threshold, the pick-off 23 generates a negative spike which resets the flip-flop 19 which, in turn, unblocks the gate 18. Now the output of the differential amplifier 11 is reapplied to the RC integrator 12 by way of gate 18 and the amplifier 17, whose output goes to the extreme negative condition which unbalances the input to the integrator 12 so that its output starts to go positive at a rate determined by the resistance and capacitance of the integrator. It continues going positive until it reaches ground potential, at which point the differential amplifier 11 is balanced and its output goes negative again, defining the end of the delay period.

As an additional feature of this invention, there is provided a positive feedback resistor shown at 47 whose effect is to place the output from the RC integrator on a very small pedestal where it is applied to the differential amplifier. This carries the differential amplifier rapidly through its range of operation as it goes out of and comes into balance. This assures that its output starts and ends in an abrupt, clean fashion.

Referring now to FIGS. 2 and 3, there is shown a schematic diagram of the preferred circuit for implementing the block diagram of FIG. 1. To simplify the explanation of the circuitry, the numbers utilized in FIG. 1 for the various portions of the diagram are also used in FIGS. 2 and 3. Additionally, there is shown a rectifier 50 for providing power to the circuitry from an alternating current source.

In the circuitry of FIGS. 2 and 3, minus 12 volts appears at line 51, and minus 9 volts appears at line 52. Assuming, initially, the switch 22 has its wiper arm connected to gate 20, that is, it is moved to the left of FIG. 1, and that one of the normally closed contacts 21*a* or 21*b* is opened by manually depressing a button, a negative signal will be applied to flip-flop 19 through gate 20 from amplifier 30 to turn on transistor 19*a*. This causes transistor 19*b* to turn off and holds transistor 19*a* on which causes a signal to be applied from the flip-flop 19 to shut off gate 18. As a result of the shutting off of gate 18, the amplifier 17 turns on and applies a ground potential to the coarse time adjustment circuit comprising resistors 15*a*–15*f* and wiper arm 16. This in turn causes a positive current to be applied to turn on the field effect transistor of the integrator shown at 13*a* which, in turn, tries to cut off emitter follower 13*b*, thereby causing emitter follower 13*c* to turn on. As a result, a negative sloped waveform is developed at point 60, shown in FIG. 2.

The negative potential eventually causes the transistor shown at 23*a* to turn on when the voltage at the base of transistor 23*a* is equal to the negative voltage set at the base of transistor 23*b*. Before transistor 23*a* turns on, the differential amplifier 11, due to the voltage appearing at point 60, becomes unbalanced. In particular, voltages between transistors 11*a* and 11*b* were initially balanced, but when the voltage at point 60 begins to go negative, the differential amplifier becomes unbalanced. This causes transistor 11*c* of the differential amplifier 11 to go off, causing a signal to be applied from transistor 11*c* through gate 18 in an attempt to turn on amplifier 17 once again but, since gate 18 is still closed, amplifier 17 will remain in an on condition.

As mentioned previously, when transistor 23*a* turns on, a signal is provided to turn on gate 18 so as to permit the signal from differential amplifier 11*c* to turn off the amplifier 17. This is permitted to occur since the turning on of the pick-off device 23 causes the flip-flop 19 to be reset, such that a signal is applied from the flip-flop to reopen gate 18. When the amplifier 17 turns on once again, a negative signal is applied from the amplifier to turn on the field effect transistor 13*a* and point 60 tends to go positive. This shuts off the pick-off device and rebalances the differential amplifier 11.

During the period of time the above is taking place, output signals are developed across transistors 29 and 30 which act as a one-shot multivibrator. When the flip-flop is initially turned on, gate 10 is caused to be shut off and amplifier 29 turns off and amplifier 30 turns on. At the end of the cycle, when the differential amplifier 29 becomes rebalanced, amplifier 29 which had been off turns on and amplifier 30 turns off.

In order to provide the chopper signal output, signals are tapped off by way of switch 36 from amplifiers 29 and 30 to operate the chopper shown at 37. In this way pulses of 60-cycle alternating current signals may be provided at the AC output terminals.

To adjust the pick-off, which is termed herein as "fine time," there is provided a pair of potentiometers shown at 70 and 71, respectively, for setting the negative voltage which will trigger the transistor 23*a*.

Although it will be understood that the circuit values may be changed or varied in accordance with the particular design required, for the purposes of an example the transistors (NPN transistors) utilized herein are preferably 2N2926 and the PNP transistors are preferably 2N3638. The field effect transistor is preferably a TIX–S11. The respective signal waveforms are shown in FIG. 1, as indicated.

It will thus be seen that the objects set forth above, among those made apparent from the preceding description, are efficiently attained and since certain changes may be made in the above constructions without departing from the spirit and scope of the invention, it is intended that all matter contained in the foregoing description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A signal generator comprising in combination a differential amplifier, a bi-stable device having two stable states of operation, a gate, said gate being open or closed dependent on the state of said bi-stable device, an amplifier, said amplifier receiving the output signal from said gate, an integrator, means for applying the output signal of said amplifier to said integrator, the output of said integrator being coupled to said differential amplifier, and means responsive to said integrator for changing the state of said bi-stable device.

2. A timing apparatus, comprising a differential amplifier having two inputs, a resistance capacitance integrator coupled to one of said inputs to said differential amplifier, gating means for providing a signal to said integrator, a flip-flop and a pick-off means coupled to said integrator and arranged to apply a signal therefrom to said flip-flop; said flip-flop providing a signal to said gating means to control the application of a signal from said differential amplifier to gating means.

3. A timing apparatus in accordance with claim 2, including means for setting said gating means to initiate operation of said timing apparatus.

4. A timing apparatus in accordance with claim 2, including second gate means and means coupling a signal through the differential amplifier and through said second gate means to control the operation of said flip-flop.

5. A timing apparatus in accordance with claim 4, wherein said last-mentioned means includes third gate means and wherein means are provided to selectively block said second and third gate means.

6. A timing apparatus in accordance with claim 2, including means for combining output signals from said differential amplifier and said flip-flop.

7. A timing apparatus in accordance with claim 2, including means for selectively setting the rate of integration of said integrator means.

8. A timing apparatus in accordance with claim 2, including means for selectively setting the response of said pick-off means to signals provided by said integrator.

9. A timing apparatus in accordance with claim 6, wherein positive feedback means are coupled between the input to differential amplifier and an output of the timing apparatus.

10. A timing apparatus in accordance with claim 9, wherein said feedback means comprises a resistor.

References Cited

UNITED STATES PATENTS

| | | | |
|---|---|---|---|
| 3,036,274 | 5/1962 | Greatbatch. | |
| 3,161,045 | 12/1964 | Ames. | |
| 3,171,982 | 3/1965 | Ruhland | 307—235 |
| 3,185,932 | 5/1965 | Walker et al. | |
| 3,222,600 | 12/1965 | Gewirtz. | |
| 3,280,347 | 10/1966 | Blokker | 307—235 |

JOHN S. HEYMAN, Primary Examiner

U.S. Cl. X.R.

307—247, 267, 293; 330—30